(12) United States Patent
Abukar

(10) Patent No.: US 10,638,864 B2
(45) Date of Patent: May 5, 2020

(54) CONTAINER ILLUMINATING DEVICE

(71) Applicant: Amran Abukar, Willmar, MN (US)

(72) Inventor: Amran Abukar, Willmar, MN (US)

( * ) Notice: Subject to any disclaimer, the term of this patent is extended or adjusted under 35 U.S.C. 154(b) by 0 days.

(21) Appl. No.: 15/952,850

(22) Filed: Apr. 13, 2018

(65) Prior Publication Data
US 2018/0310743 A1 Nov. 1, 2018

Related U.S. Application Data

(60) Provisional application No. 62/490,107, filed on Apr. 26, 2017.

(51) Int. Cl.
| F21V 33/00 | (2006.01) |
| A47G 23/03 | (2006.01) |
| F21V 23/04 | (2006.01) |
| A47G 23/02 | (2006.01) |
| H04R 1/02 | (2006.01) |
| G06F 3/16 | (2006.01) |
| A61J 9/06 | (2006.01) |
| F21Y 113/10 | (2016.01) |

(52) U.S. Cl.
CPC ......... *A47G 23/0309* (2013.01); *A47G 23/02* (2013.01); *A47G 23/0241* (2013.01); *A61J 9/0607* (2015.05); *A61J 9/0646* (2015.05); *A61J 9/0684* (2015.05); *F21V 23/0435* (2013.01); *F21V 23/0471* (2013.01); *F21V 33/0036* (2013.01); *F21V 33/0056* (2013.01); *G06F 3/165* (2013.01); *H04R 1/028* (2013.01); *A47G 23/0216* (2013.01); *F21Y 2113/10* (2016.08); *H04R 2420/07* (2013.01)

(58) Field of Classification Search
CPC .................................................. A47G 23/0309
USPC ........................................................... 345/204
See application file for complete search history.

(56) References Cited

U.S. PATENT DOCUMENTS

| 5,344,034 | A | * | 9/1994 | Eagan | ...................... A61J 9/00 |
| | | | | | 215/11.1 |
| 5,575,553 | A | * | 11/1996 | Tipton | ............... A47G 19/2227 |
| | | | | | 362/101 |
| 5,662,406 | A | | 9/1997 | Mattice et al. | |
| 5,990,790 | A | * | 11/1999 | Lusareta | ............ A47G 23/0306 |
| | | | | | 206/459.1 |
| 6,005,204 | A | * | 12/1999 | Choi | .................. A47G 19/2227 |
| | | | | | 200/52 R |
| 6,104,292 | A | * | 8/2000 | Rombom | .................. A61J 9/00 |
| | | | | | 340/573.1 |
| 6,158,870 | A | * | 12/2000 | Ramirez | ............... A61J 9/0607 |
| | | | | | 215/11.1 |

(Continued)

*Primary Examiner* — Matthew J. Peerce
(74) *Attorney, Agent, or Firm* — Mueting, Raasch & Gebhardt, P.A.

(57) ABSTRACT

A bottle holder with a body includes an upper portion; a base; a cup seat disposed in the upper portion; and one or more lighting elements, at least one of the lighting elements being disposed below the cup seat and oriented to direct light upward. The bottle holder further includes a cup removably positioned in the cup seat, the cup being constructed to support a bottle. The bottle holder may include a control system configured to control the one or more lighting elements and other electronic components that may optionally be included. A system for illuminating a container includes a bottle holder and a remote control unit constructed to communicate with a control unit of the bottle holder.

15 Claims, 4 Drawing Sheets

(56) References Cited

U.S. PATENT DOCUMENTS

| | | | | |
|---|---|---|---|---|
| 6,443,589 B1* | 9/2002 | Lee | A47G 19/2227 | |
| | | | 362/101 | |
| 7,419,072 B1* | 9/2008 | Vanella | A47G 23/0309 | |
| | | | 222/113 | |
| 7,690,533 B2* | 4/2010 | Stilley | B05B 11/0005 | |
| | | | 222/113 | |
| 8,550,288 B2* | 10/2013 | Briar | B65D 25/02 | |
| | | | 137/386 | |
| 8,919,981 B2* | 12/2014 | Wang | A47G 19/2227 | |
| | | | 362/101 | |
| 10,106,105 B2* | 10/2018 | Hansen | B60N 3/101 | |
| 2003/0076672 A1* | 4/2003 | Head | A47G 23/0309 | |
| | | | 362/101 | |
| 2004/0114352 A1* | 6/2004 | Jensen | A47G 23/0309 | |
| | | | 362/101 | |
| 2006/0097121 A1* | 5/2006 | Fugate | A47G 23/0309 | |
| | | | 248/311.2 | |

* cited by examiner

CONTAINER ILLUMINATING DEVICE

CROSS-REFERENCE TO RELATED APPLICATIONS

This application claims the benefit of U.S. Provisional Application Ser. No. 62/490,107 filed Apr. 26, 2017.

FIELD

The present disclosure relates to systems and devices for illuminating a container placed on the system. In particular, the present disclosure relates to systems and devices that may be used to illuminate a bottle containing liquid to allow observation of the amount of liquid in the bottle.

SUMMARY

The present disclosure provides a bottle holder with a body that includes an upper portion; a base; a cup seat disposed in the upper portion; and one or more lighting elements, at least one of the lighting elements being disposed below the cup seat and oriented to direct light upward. The bottle holder further includes a cup removably positioned in the cup seat, the cup being constructed to support a bottle.

The bottle holder may include a control system configured to control the one or more lighting elements and other electronic components that may optionally be included.

The present disclosure further provides a system for illuminating a container, where the system includes a bottle holder and a remote control unit configured to communicate with a control unit of the bottle holder.

DETAILED DESCRIPTION

Figure 1:
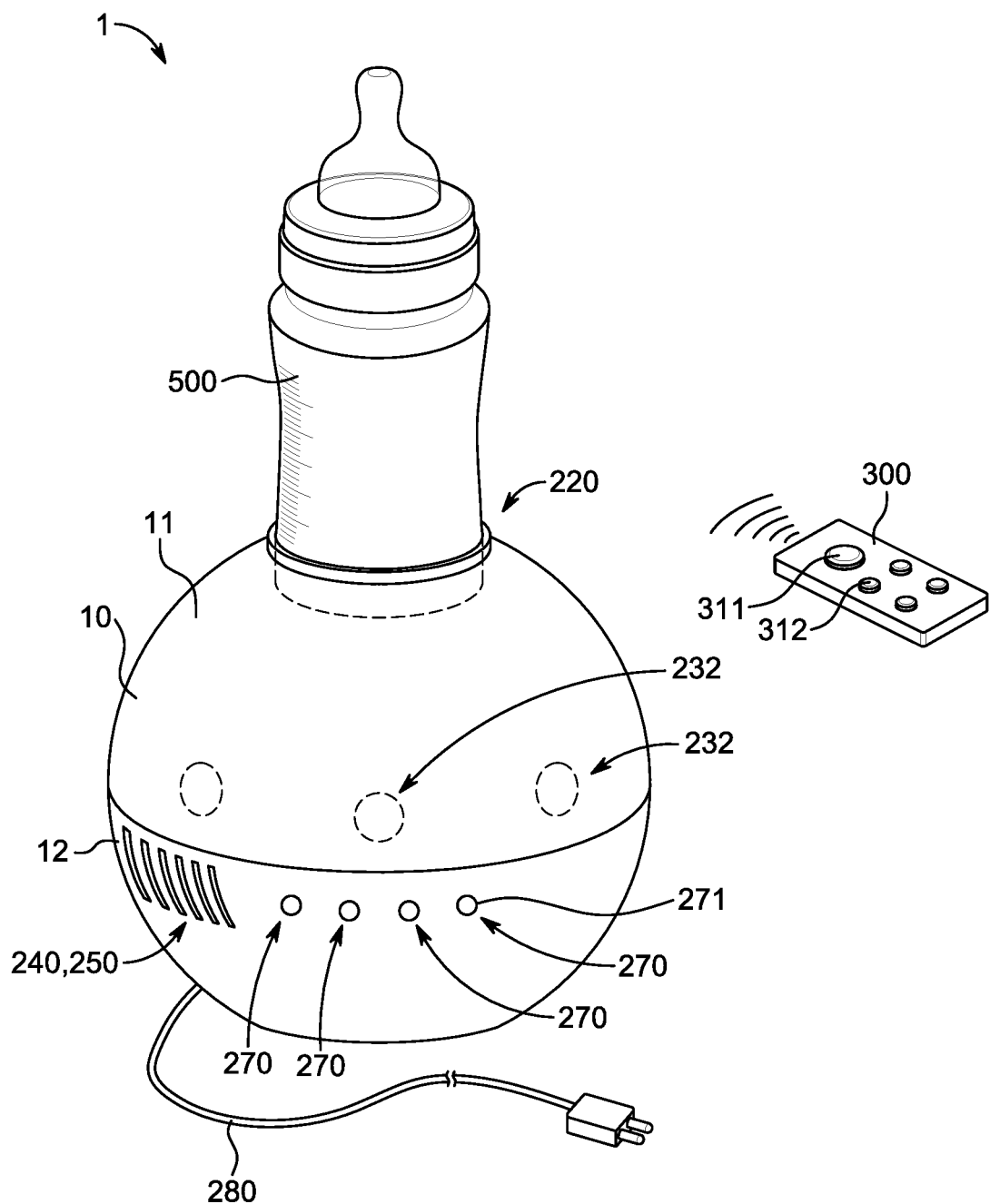
FIG. 1 is a perspective view of a system for illuminating a bottle according to an embodiment.

The present disclosure relates to systems and devices for supporting and illuminating a container. In particular, the present disclosure relates to systems and devices for supporting and illuminating a bottle that may contain a liquid. The systems and devices of the present disclosure may include other features, such as light and sound, and may be manually, automatically, or remotely controlled.

The terms "plastic," "polymer" and "polymeric material" refer to materials prepared from monomers, such as homopolymers, and to materials prepared from two or more monomers, such as copolymers, terpolymers, or the like.

A "resilient" polymeric material or article is one that, when deformed, will return to approximately original dimensions in a relatively short time. Examples of resilient polymeric materials include natural and synthetic rubbers, elastomers, and certain polyurethanes and polyols that exhibit a suitable flexibility or ability to return to their original dimensions.

The term "transparent" is used in this disclosure to describe a material that can be seen through with a naked eye. A transparent material transmits at least 90% of electromagnetic radiation having wavelengths in the ultraviolet to infrared spectrum (e.g., from about 200 nm to about 1400 nm; "UV-IR"). A transparent material may be colorless or colored.

The term "opaque" is used in this disclosure to describe materials that do not allow visible light to pass through. An opaque material transmits less than 10% of electromagnetic radiation having wavelengths in the ultraviolet to infrared spectrum (e.g., from about 200 nm to about 1400 nm; "UV-IR"). An opaque material may be colorless or colored.

The term "translucent" is used in this disclosure to describe a material quality that is between opaque and transparent. For example, it may be possible to see a liquid level through a translucent wall of a container.

Relative terms such as proximal, distal, left, right, forward, rearward, top, bottom, side, upper, lower, horizontal, vertical, and the like may be used in this disclosure to simplify the description. However, such relative terms do not to limit the scope of the invention in any way. Terms such as left, right, forward, rearward, top, bottom, side, upper, lower, horizontal, vertical, and the like are from the perspective observed in the particular figure.

The term "about" is used here in conjunction with numeric values to include normal variations in measurements as expected by persons skilled in the art, and is understood have the same meaning as "approximately" and to cover a typical margin of error, such as ±5% of the stated value.

Terms such as "a," "an," and "the" are not intended to refer to only a singular entity but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The terms "preferred" and "preferably" refer to embodiments of the disclosure that may afford certain benefits, under certain circumstances. However, other embodiments may also be preferred, under the same or other circumstances. The recitation of one or more preferred embodiments does not imply that other embodiments are not useful, and is not intended to exclude other embodiments from the scope of the disclosure.

According to some embodiments and as shown in FIG. 1, a bottle holder 1 includes a body 10 with an upper portion 11 and a lower portion 12 coupled with the upper portion 11. The upper portion 12 includes a cup seat 210 (see FIG. 2A) to retain a removable cup 220 that is constructed to support or house a bottle 500 or other container (e.g., a glass or cup). The body 10 houses one or more lighting elements 230 (see FIG. 3) that can be used to illuminate the bottle 500 or be used as a room light or as a night light, etc. At least one of the lighting elements is positioned below the cup seat and oriented so that it emits light upward toward the cup and a container seated in the cup. The bottle holder 1 may further contain various electrical components, such as a sound system, a control unit 260, and a power source 280.

Figure 2A:
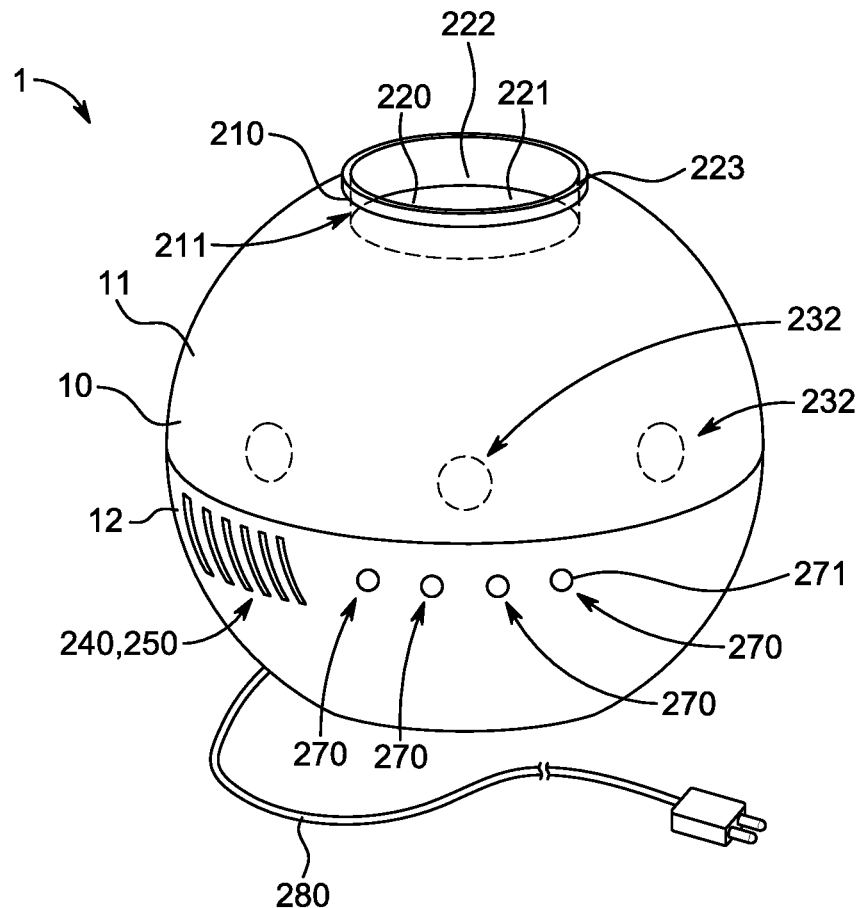
FIG. 2A is a perspective view of a bottle holder of the system of FIG. 1 according to an embodiment.
Figure 2B:
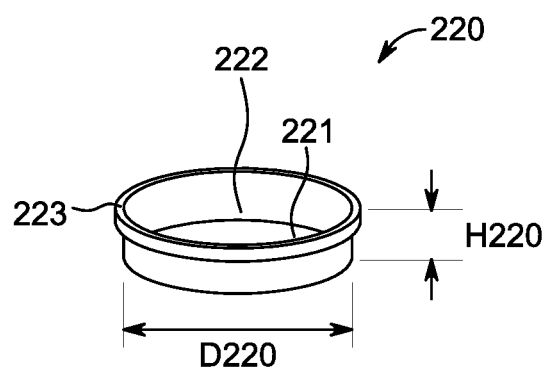
FIG. 2B is a perspective view of a cup of the bottle holder of FIG. 2A according to an embodiment.

Referring now to FIGS. 2A and 2B, the bottle holder 1 body 10 and cup 220 are shown. The body 10 has an outer shell including an upper portion 11 coupled with a base or lower portion 12. The upper and lower portions 11, 12 may define two separate pieces or may be integrally formed. In embodiments where the upper and lower portions 11, 12 define two separate pieces, the two pieces may be connected by any suitable method, such as friction fit, adhesive, threads, snap fit, etc. The upper and lower portions 11, 12 may be made from any suitable material, and may include the same or different materials. For example, the upper and lower portions 11, 12 may include polymeric materials, metal, wood, glass, etc. In one embodiment, at least a portion of the upper portion 11 includes a transparent or translucent material.

The body 10 is shown having the shape of a globe with a flattened bottom. However, any suitable shape may be selected, such as semisphere, spheroid (with one or more flattened sides), cylinder, cube, cuboid, prism, and various other polyhedrons, etc. The shape may also be irregular or be modeled after a figure or character, such as a cartoon character, an animal, plant, toy, etc.

The cup 220 may be removably positioned in the cup seat 210. The cup seat 210 may define a depression in the upper portion 11 of the body 10, or may simply be an aperture in the wall of the upper portion 11. The edge 211 of the cup seat 210 may optionally include a rim to facilitate positioning and seating the cup 220. The cup 220 and cup seat 210 may be sized and shaped so that the cup 220 fits into the cup seat 210 snugly and does not easily or inadvertently fall out. A snug fit may also help protect elements inside the body 10 from possible liquid spills.

The cup 220 may include a bottom 221 and a wall 222 circumscribing the bottom 221 and extending from the bottom 221 to an upper edge. The upper edge of the cup 220 may include a lip 223. The lip 223 may facilitate seating the cup 220 in the cup seat 210 at the intended height and removing the cup 220 from the cup seat 210 when desired. When the cup 220 is seated in the cup seat 210, the upper edge of the cup 220 may be approximately level with the top (the highest point) of the body 10, may be slightly above the top of the body 10, or the cup 220 may be mostly above the top of the body 10.

The cup 220 may be made of any suitable material. In some embodiments, the cup 220 may include a resilient polymeric material, such as natural or synthetic rubber, silicone, polyurethane, and the like, or a combination thereof. Preferably, the cup 220 is resilient and waterproof so that it may be removed, washed, and replaced. The material of the cup 220 may also be transparent or translucent. The cup 220 may include a combination of materials such that the bottom 221, the wall 222, and/or the lip 223 have different qualities, such as different color, different transparency, translucency, or opacity, and different resiliency or elasticity. In some embodiments, at least the bottom 221 of the cup 220 is transparent or translucent.

The cup 220 may be sized to support or house a bottle or other container (e.g., a glass or cup). For example, the cup 220 may have a diameter D220 that accommodates a common bottle size. The diameter D220 may range from about 1.5 inches to about 3 inches, or from about 1.75 inches to about 2.5 inches. In some embodiments, the cup 220 is sized to accommodate a baby bottle.

The cup 220 may have a height H220 that at the same time helps securely house the bottle but does not excessively cover the contents of the bottle. For example, the cup 220 may have a height H220 that for a given bottle size, covers no more than about the bottom 25 mL, bottom 40 mL, or bottom 50 mL of liquid in the bottle. If the bottle has volume markings on the side, the upper edge of the cup 220 may come up to about the 25 mL marking, the 30 mL marking, the 40 mL marking, or the 50 mL marking. In practice, the cup height H220 (as measured on the inside of the cup 220) may be up to about 0.25 inches, about 0.3 inches, about 0.4 inches, about 0.5 inches, or up to about 0.75 inches. The cup height H220 may be about 1 inch or less, about 0.75 inches or less, or about 0.5 inches or less.

Figure 3:
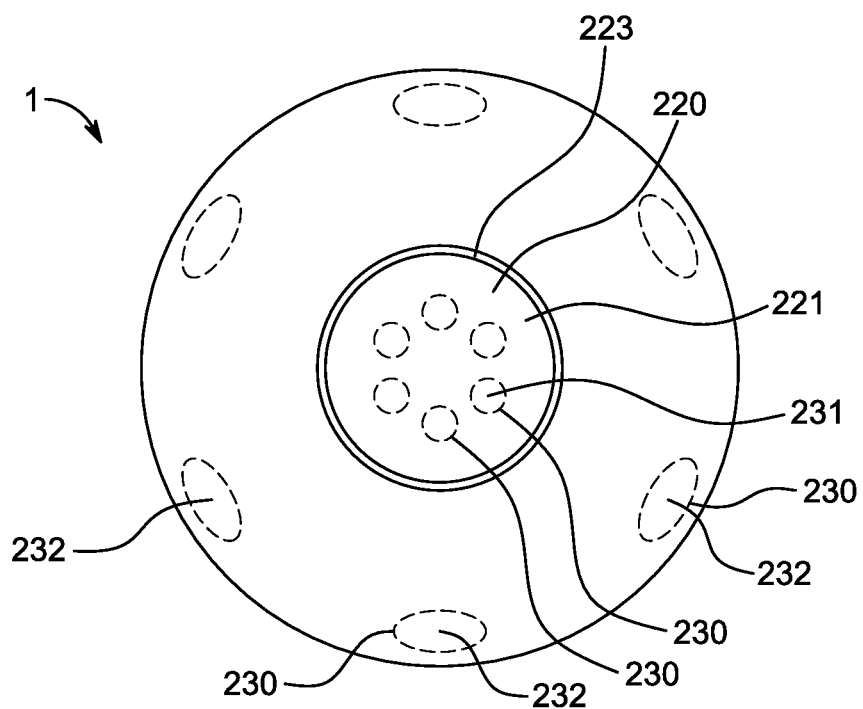
FIG. 3 is a top view of the bottle holder of FIG. 2A according to an embodiment.

The bottle holder 1 may include various lighting elements 230, as shown in FIGS. 2A and 3. According to an embodiment, the lighting elements 230 include one or more bottle lights 231 that are positioned directly below the cup 220 and capable of illuminating a bottle placed in the cup 220. The number of bottle lights 231 may vary, and may be 1, 2, 3, 4, 5, 6, 7, 8, 9, 10, or even greater. In some embodiments, the number of bottle lights 231 is 1 or greater, and up to 6. The number of the bottle lights 231 may be determined, for example, based on the size and the brightness (e.g., measured in lumens) of the lights. The bottle lights 231 may be selected so that they illuminate the bottle placed in the cup 220 and any liquid in the bottle. The bottle lights 231 and the liquid in the bottle may also form a light guide, emitting light into the surrounding environment.

The lighting elements 230 may include one or more room lights 232 disposed along the body 10 (e.g., along the sides of the body). The room lights 232 may be oriented so that they emit light through the wall of the body 10, or through one or more openings in the wall of the body 10. The position of the room lights 232 may vary, and lights may be positioned either in the upper portion 11, the base 12, or both, and may be disposed on one side or may be distributed around the perimeter of the body 10. The number of room lights 232 may vary, and may be 1, 2, 3, 4, 5, 6, 7, 8, 9, 10, or even greater. In some embodiments, the number of room lights 232 is 1 or greater, and up to 6. The number and brightness of room lights 232 may be selected to achieve a desired brightness of light emitted from the bottle holder 1 into the surrounding environment.

The bottle lights 231 and the room lights 232 may include any suitable light sources. For example, the bottle lights 231 and the room lights 232 may include LEDs (light emitting diodes) or incandescent lights. Preferably, the bottle lights 231 and the room lights 232 are LEDs. The bottle lights 231 and the room lights 232 may all emit white light or a single color of light (e.g., a color other than white), or may be capable of emitting various colors of light (e.g., 2 or more, 3 or more, or 4 or more colors). In some embodiments, at least some of the lighting elements 230 are capable of emitting more than one color of light and may also be capable of switching color. In one embodiment, the bottle lights 231 include LEDs capable of emitting white light, and the room lights 232 include LEDs capable of emitting one or more colors (other than white) of light.

Figure 6:
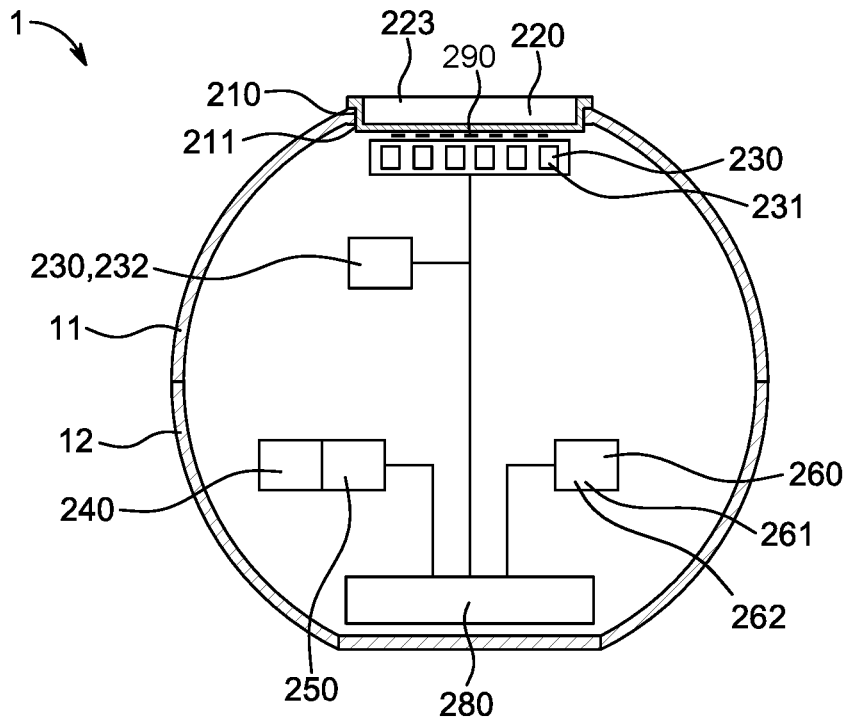
FIG. 6 is a cross sectional side view of the bottle holder of FIG. 2A according to an embodiment.

The bottle holder 1 may further include various electrical components and a control unit 260, as shown schematically in the cross-sectional view of FIG. 6. In addition to the lighting elements 230 (including bottle lights 231 and room lights 232), the bottle holder 1 may include a sound system with a microphone 240 and a loudspeaker 250. The microphone 240 and loudspeaker 250 may be operatively connected to a data storage unit 262, and may be used to record and/or replay sound files.

The bottle holder 1 may also include a sensor 290 positioned at or below the cup seat 210. The sensor 290 may be configured to sense the presence of a container on the cup 220, and may be connected to the control unit 260 to control the bottle lights 231 and/or other electrical components of the bottle holder 1. The sensor 290 may be, for example, a pressure sensor.

The bottle holder 1 may include a control system with a control unit 260 constructed and configured to control the various electrical components, such as the lights and the sound system. The control unit 260 may be provided in any suitable form and may, for example, include memory and a control unit. In one or more embodiments, the control unit may, for example, be in the form of one or more microprocessors, Field-Programmable Gate Arrays (FPGA), Digital Signal Processors (DSP), microcontrollers, Application Specific Integrated Circuit (ASIC) state machines, etc.

The control unit 260 may include a data storage unit 262 and one or more control buttons 270 accessible on the outside of the body 10. The control buttons 270 may include, for example, an on/off switch for the unit as a whole, switches or controls for the lighting elements 230, and/or switches or controls for the sound system. For example, the control buttons 270 may include one or more buttons 271 to turn on or off the bottle lights 231 or the room lights 232, or to turn on or off a colored light sequence of the bottle lights 231 or the room lights 232. The control buttons 270 may include one or more buttons 271 to record sounds using the microphone 240 and/or one or more buttons to play back sounds using the loudspeaker 250. The one or more buttons 271 may also be configured to cycle through, select, and play back sounds from pre-recorded sound files stored in the data storage unit 262.

At least one or more of the electrical components (e.g., the lighting elements 230, the microphone 240, and the loudspeaker 250) may be operatively connected to and may be controlled by the control unit 260 and the data storage unit 262. The control unit 260 may further be operatively connected to the control buttons 270. The electrical components (e.g., the lighting elements 230, the microphone 240, and the loudspeaker 250) and the control unit 260 may further be connected to a power source 280.

Figure 4:
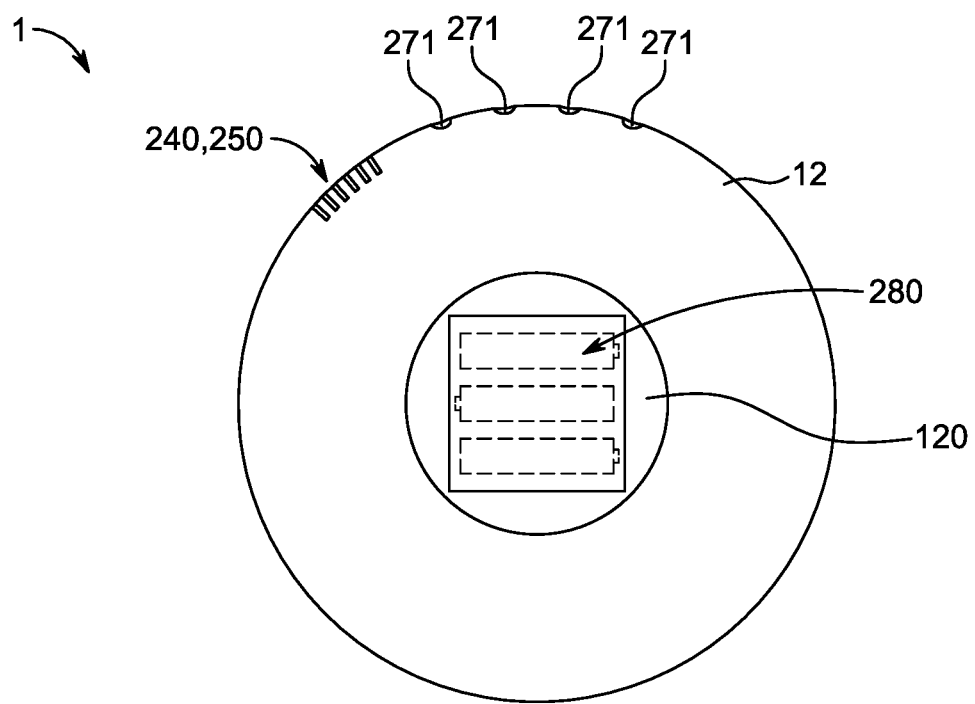
FIG. 4 is a bottom view of the bottle holder of FIG. 2A according to an embodiment.
Figure 5:
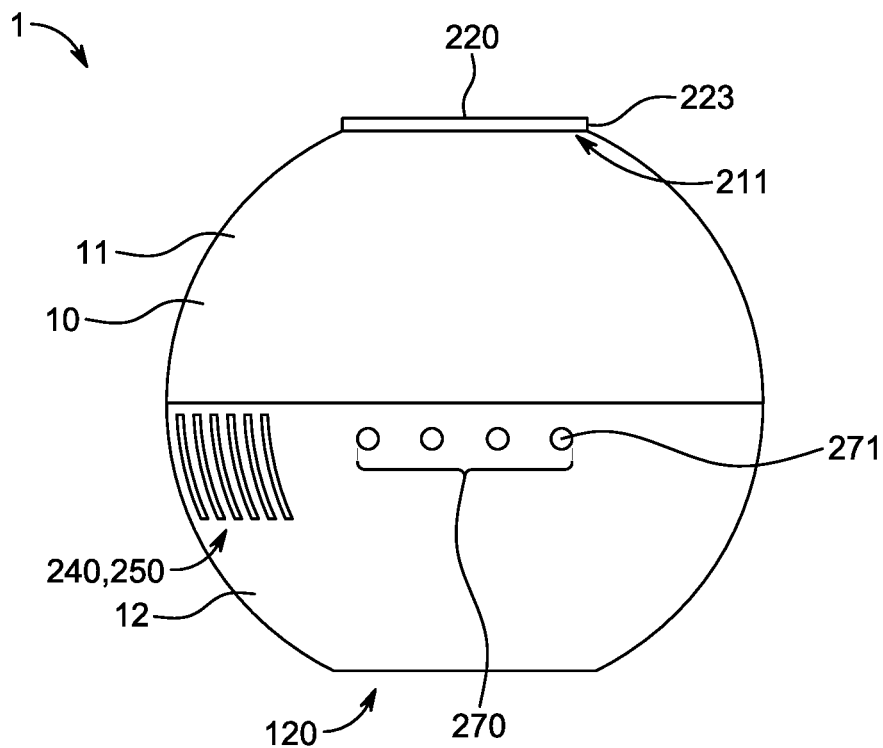
FIG. 5 is a side view of the bottle holder of FIG. 2A according to an embodiment.

Any suitable power source 280 may be used, such as a power cord connectable to an outlet, or one or more batteries. If the power source 280 includes batteries, the batteries may be positioned in a battery compartment that may be accessible, for example, through a bottom cover 120, as shown in FIG. 4.

The control system may further include a signal receiver 261 constructed to receive a remote signal. For example, the signal receiver 261 may include a BLUETOOTH® receiver constructed to receive a BLUETOOTH® signal or an infrared receiver constructed to receive an infrared signal. The control unit 260 may be configured to be controllable remotely via the BLUETOOTH® signal or infrared signal.

The control system may be configured to control the one or more lighting elements 230. For example, the control system may be configured to control the one or more lights (e.g., the room lights 232) to alternately emit the different colors of light. The control system may also be configured to control the sound system. For example, the control system may be configured to control recording of sound using the microphone 240 and play back of sound using the loudspeaker 250.

The system depicted in FIG. 1 may further include a remote control unit 300 constructed to emit a remote signal, such as a BLUETOOTH® signal or infrared signal, and a receiver constructed to receive the remote signal. The remote control unit 300 may be a mobile phone (e.g., a smart phone) and may be configured to communicate with the control system via a mobile application. Alternatively, the remote control unit 300 may be provided with designated buttons (such as an on/off button 311 and/or various control buttons 312) to remotely control the control unit 260.

In one exemplary embodiment, the bottle holder 1 is constructed to support or house a baby bottle. Babies or small children may need to be fed or given liquids to in the evening or at night, when bright lights may be distracting or detrimental to sleep quality. The bottle lights 231 of the bottle holder 1 may illuminate the baby bottle 500 so that the caretaker may observe the amount of liquid in the bottle 500 without the need to turn on other lights. The bottle holder 1 may also act as a night light, providing light from the bottle lights 231 and/or the room lights 232. The bottle holder 1 may also provide a light sequence and/or sounds that may be comforting for the baby or child. The sounds may be customized by recording spoken words, songs, or other familiar sounds that may be helpful in comforting a baby or child.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims set forth here.

The invention claimed is:

1. A bottle holder comprising:
    a body comprising:
        an upper portion;
        a base;
        a cup seat disposed in the upper portion;
        one or more lighting elements, comprising one or more lights capable of emitting two or more different colors of light;
        a control system configured to control the one or more lighting elements;
        a data storage component;
        a sound system comprising a microphone and a loudspeaker operably connected to the data storage component; and
        one or more control buttons operatively connected to the sound system; and
    a cup removably positioned in the cup seat, the cup being constructed to support a bottle, the cup comprising a bottom, wherein the entire bottom is translucent or transparent,
    at least one of the lighting elements being disposed below the cup seat and oriented to direct light upward through the bottom of the cup.

2. The bottle holder of claim 1, wherein the body further comprises a light switch.

3. The bottle holder of claim 2, wherein the light switch comprises a pressure sensor constructed to sense the presence of a bottle in the cup.

4. The bottle holder of claim 1, wherein the bottle holder comprises a sound system comprising a data storage component and a loudspeaker, and a control system configured to control the sound system.

5. The bottle holder of claim 4, wherein the control system comprises a receiver constructed to receive a remote signal.

6. The bottle holder of claim 1, wherein the one or more lighting elements comprise a room light oriented to direct light through a wall of the body.

7. The bottle holder of claim 1, wherein the bottle holder comprises a control system configured to control the one or more lights to alternately emit the different colors of light.

8. The bottle holder of claim 1, wherein the bottle holder comprises a control system configured to control the one or more lighting elements.

9. The bottle holder of claim 8, wherein the control system comprises a receiver constructed to receive a remote signal.

10. The bottle holder of claim 1, wherein the body comprises one or more control buttons operatively connected to the one or more lighting elements.

11. The bottle holder of claim 1, wherein the cup seat defines a depression or an aperture in the body.

12. The bottle holder of claim 1, wherein the cup comprises a resilient polymeric material.

13. The bottle holder of claim 1, wherein the body comprises an outer shell, and wherein at least a portion of the outer shell is transparent or translucent.

14. The bottle holder of claim 1, wherein the cup is removable and washable.

15. The bottle holder of claim 1, wherein the cup has a height that covers 50 mL or less of liquid contents of a bottle supported by the cup.

\* \* \* \* \*